United States Patent
Davis et al.

(10) Patent No.: US 7,885,816 B2
(45) Date of Patent: Feb. 8, 2011

(54) EFFICIENT PRESENTATION OF CORRECTION OPTIONS IN A SPEECH INTERFACE BASED UPON USER SELECTION PROBABILITY

(75) Inventors: Brent L. Davis, Deerfield Beach, FL (US); J. Scott Gee, Fort Worth, TX (US); James R. Lewis, Delray Beach, FL (US); Vanessa V. Michelini, Boca Raton, FL (US); Melanie D. Polkosky, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1831 days.

(21) Appl. No.: 10/730,662

(22) Filed: Dec. 8, 2003

(65) Prior Publication Data

US 2005/0125270 A1    Jun. 9, 2005

(51) Int. Cl.
*G10L 21/00* (2006.01)
*G10L 15/00* (2006.01)
*G06F 3/16* (2006.01)

(52) U.S. Cl. .................. 704/270; 704/251; 704/275; 715/728

(58) Field of Classification Search .................. None
See application file for complete search history.

(56) References Cited

U.S. PATENT DOCUMENTS

| | | | |
|---|---|---|---|
| 5,638,425 A | 6/1997 | Meador, III et al. | |
| 5,917,891 A | 6/1999 | Will | |
| 6,243,684 B1 | 6/2001 | Stuart et al. | |
| 6,393,389 B1 * | 5/2002 | Chanod et al. | ........... 704/7 |
| 6,404,876 B1 | 6/2002 | Smith et al. | |
| 6,539,078 B1 | 3/2003 | Hunt et al. | |
| 7,246,062 B2 * | 7/2007 | Knott et al. | ........... 704/246 |
| 7,386,454 B2 * | 6/2008 | Gopinath et al. | ........... 704/270 |
| 2002/0032564 A1 | 3/2002 | Ehsani et al. | |
| 2002/0072917 A1 | 6/2002 | Irvin et al. | |
| 2002/0169615 A1 | 11/2002 | Kruger et al. | |
| 2002/0196911 A1 | 12/2002 | Gao et al. | |
| 2003/0189603 A1 * | 10/2003 | Goyal et al. | ........... 345/863 |

\* cited by examiner

OTHER PUBLICATIONS

Kotan, C. et al. "Comparison of two delayed confirmation strategies for speech recognition interactive voice response systems," (Tech. Report 29.3675). Raleigh, NC: IBM Corp. (2003).\*

*Primary Examiner*—Matthew J Sked
(74) *Attorney, Agent, or Firm*—Novak Druce + Quigg LLP

(57) ABSTRACT

A method, a system, and an apparatus for efficiently presenting correction options. The present invention is capable of analyzing user voice commands and sorting multiple input requests based on user selection probability to determine whether a confirmation step should be presented and, if so, the manner in which the confirmation step should be presented. In particular, the method requests an information input from the user and then assigns a confidence level to the information input. If the confidence level is LOW, then the system performs an immediate confirmation step. If the confidence level assigned is MEDIUM or HIGH, then the information is placed into a data set that is confirmed in a batch confirmation step. The batch confirmation step presents the captured information to the user for confirmation. If any of the information is incorrect, then the method sorts the information in ascending order by confidence level and creates a menu of items that may be changed. The user then makes the change. Once all changes have been made, the batch confirmation is complete as well as the information collection process.

3 Claims, 2 Drawing Sheets

EFFICIENT PRESENTATION OF CORRECTION OPTIONS IN A SPEECH INTERFACE BASED UPON USER SELECTION PROBABILITY

BACKGROUND

1. Field of the Invention

The present invention relates to the field of speech recognition and, more particularly, to speech-based user interfaces.

2. Description of the Related Art

Speech interfaces are frequently used in conjunction with database-driven systems to provide users with a speech-based method of searching for information. One common example of such a system is a flight information system where a user can verbally specify an argument, such as an airline or city, for which the speech-enabled system can search. Speech interfaces can work effectively in cases where a speech recognition engine correctly recognizes the voice commands. If the engine misrecognizes the voice commands, however, the database search will return the information based on misrecognized user requests and therefore be incorrect, unless the user is provided with an opportunity to correct the request.

Correction within a speech interface, however, can be problematic due to the effects caused by the confirmation steps. Specifically, each voice command may result in a series of options that are played to the user. If too many options are presented, the confirmation process may become tedious as each option is presented. However, if no options are present, and hence no confirmation is permitted, a misrecognition may go uncorrected.

As a result, it is often beneficial to have a user confirm a selection to ensure that a selection has not been misrecognized by the speech interface. However, if each and every voice command is required to be confirmed, the number of confirmation steps can result in long and tedious dialog flows between the user and the speech interface. At the same time, if confirmation steps are not used or are underutilized, then the user may be lead down the wrong path or may be given incorrect information due to the misrecognition of the voice command by the speech interface.

Accordingly, it would be beneficial to reduce the number of confirmation steps, thereby reducing the length of time a user would interact with the speech interface. It would also be beneficial to maintain a high degree of accuracy, thereby reducing the consequences of misrecognition and/or correcting any misrecognitions sooner.

SUMMARY OF THE INVENTION

The present invention provides a method, a system, and an apparatus for efficiently presenting correction options. More specifically, the present invention is capable of analyzing user voice commands based on confidence levels to determine whether a confirmation step should be presented immediately or in batch and, for the last option, the order in which the correction options should be presented if the user rejects the batch confirmation.

In general, the present invention provides a method for efficiently presenting correction options, wherein the method includes the steps of requesting an information input from the user. Then a confidence level is assigned to the information supplied by the user. If the confidence level is LOW, then the system performs an immediate confirmation step with the resulting information having a HIGH confidence level. If the confidence level assigned is MEDIUM or HIGH, then the information is placed into a data set that is confirmed in a batch confirmation step.

The batch confirmation method begins with the step of presenting captured information to the user for confirmation. The user is then queried as to whether all the information is correct. If the user responds negatively, then the method proceeds by sorting the information in ascending order by confidence level. The system then creates a menu of items that may be changed. The system then prompts the user for an information item to be changed using the menu. The desired option is selected by the user. Finally, the user is queried as to whether the user is finished making changes to the information. If yes, then the match confirmation step is complete. If no, then the system permits the user to make additional changes until the information collection is complete.

More particularly, in one embodiment, the present invention provides a method for efficiently presenting correction options including the steps of receiving at least one information input; processing the at least one information input; assigning a confidence level to the at least one information input; placing the at least one information input in a batch data; and performing a batch confirmation step after all information inputs have been received and assigned a confidence level. The batch confirmation comprises the steps of presenting the batch data to be confirmed; prompting a user to select an information input to be changed; sorting items in the batch data in ascending order by the assigned confidence level if the user selects an information input to be changed; creating a menu of items using the order from the sorting step; and prompting a user to select a new information input.

More particularly, in another embodiment, the present invention provides a machine-readable storage having stored thereon, a computer program having a plurality of code sections, said code sections executable by a machine for causing the machine to perform the steps of receiving at least one information input; processing the at least one information input; assigning a confidence level to the at least one information input; placing the at least one information input in a batch data; and performing a batch confirmation step after all information inputs have been received and assigned a confidence level. The batch confirmation comprises the steps of presenting the batch data to be confirmed; prompting a user to select an information input to be changed; sorting items in the batch data in ascending order by the assigned confidence level if the user selects an information input to be changed; creating a menu of items using the order from the sorting step; and prompting a user to select a new information input.

In yet another embodiment, the present invention provides a system for efficiently presenting correction options including means for receiving at least one information input; means for processing the at least one information input; means for assigning a confidence level to the at least one information input; means for placing the at least one information input in a batch data; and means for performing a batch confirmation step after all information inputs have been received and assigned a confidence level.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
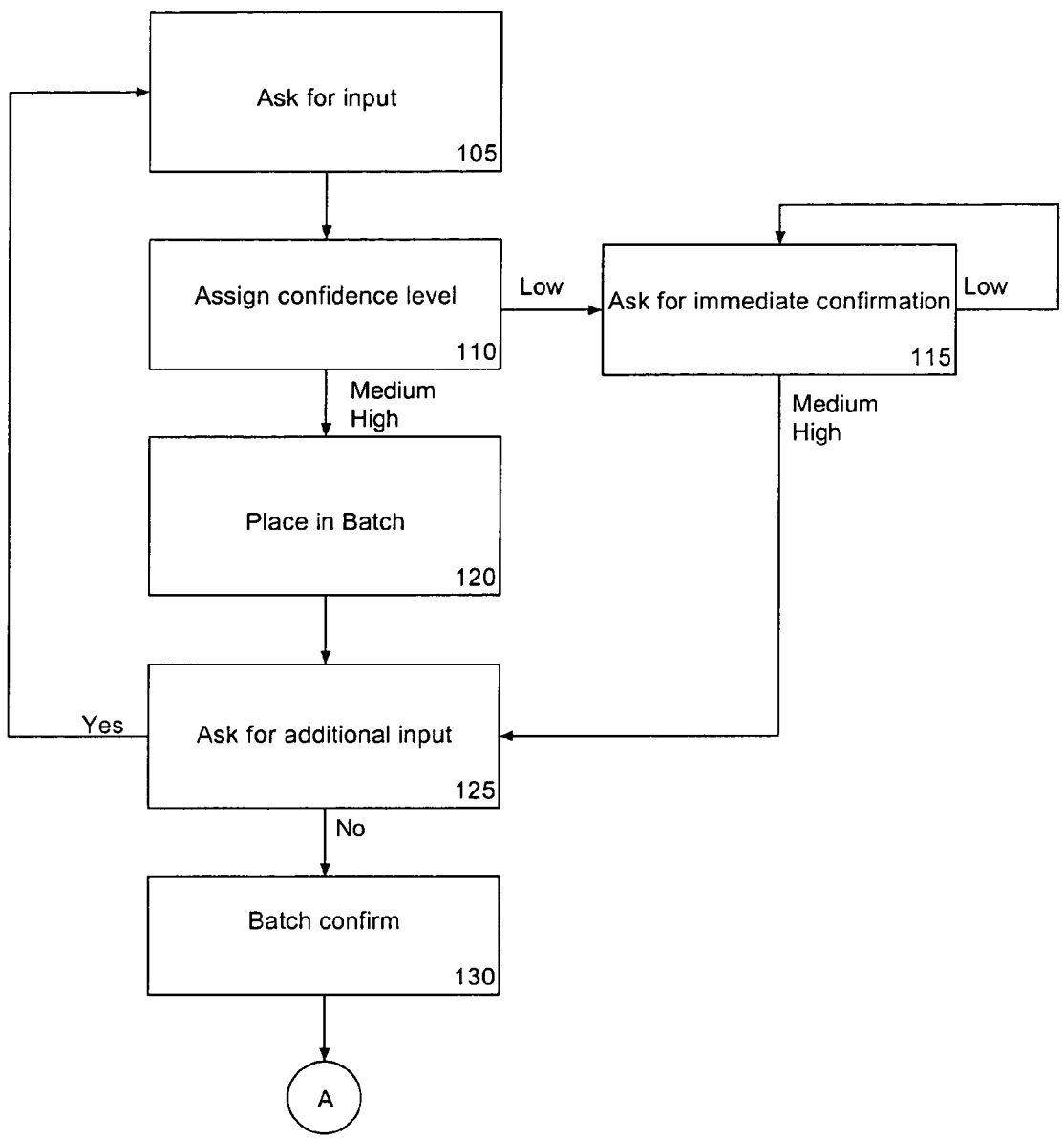
FIG. 1 is a flow chart illustrating a method of efficiently presenting correction options in accordance with the inventive arrangements disclosed herein.

The present invention provides a method, a system, and an apparatus for efficiently presenting correction options. More specifically, the present invention includes a method for efficiently presenting correction options. The method may be separated into two separate confirmation methods: an immediate confirmation for low confidence level results and a batch confirmation for medium and high confidence level results. The method of the present invention sorts the correction options in a confirmation step, based on confidence levels, assuming that the MEDIUM confidence level has a higher probability of user selection than a HIGH confidence level. The sorting, which may be performed primarily as a function of confidence, increases the chances that desirable options will be presented first, thereby reducing the likelihood that a user will hear a list of undesirable options.

Those skilled in the art will recognize that the present invention may be used with any of a variety of speech-enabled systems which incorporate database and database search functions. Accordingly, although a speech-enabled travel information system has been used for purposes of illustration, the present invention is not so limited to the particular examples and embodiments as disclosed herein.

The following example provides the manner in which the method of the present invention efficiently presents correction options. A user is attempting to access a flight information system having a speech user interface. The interface application needs to collect certain information, such as the airline, the departure and arrival cities, the departure time, and the date. For each information collected, the present invention will classify the confidence level as HIGH, MEDIUM, or LOW, based upon scores by a recognition engine. If the confidence level is LOW, then an immediate confirmation method is used to verify the information. If the confidence level is HIGH or MEDIUM, then these items will be confirmed in a batch confirmation method, wherein the options will be sorted based on their probability of selection by the user, as determined by the confidence scores.

Computer: Welcome to XYZ Automated Travel System. Please select flight status, available flights, or exit.
    Caller: Flight status.
    Computer: Which airline?
    Caller: American Airlines. (HIGH)
    Computer: Departure City?
    Caller: Miami. (HIGH)
    Computer: Approximate departure time?
    Caller: 10:00 a.m. (MEDIUM)
    Computer: Arrival City?
    Caller: Newark. (MEDIUM)
    Computer: Which day?
    Caller: May $30^{th}$. (LOW)

At this point, the system will perform an immediate confirmation as the confidence level for the last response was LOW.
    Computer: Was that May $13^{th}$?
    Caller: No, May $30^{th}$. (HIGH)

Now that all of the information has been collected, the system will perform a batch confirmation step to confirm the information.
    Computer: Thank you. Let's review: American Airlines departing from Miami International Airport at approximately 10:00 a.m. and arriving in New York LaGuardia airport on May $30^{th}$. Is that correct?
    Caller: No.

At this point, the system will present the correction prompt. As the date was confirmed before, it does not need to be included in the options, although it may be included with the other HIGH confidence level options. There are two MEDIUM confidence level options and two remaining options with a HIGH confidence level. Using the method of the present invention, the system will sort the correction options to present to the caller, from MEDIUM to HIGH, as follows: departure time, arrival city, airline, and departure city. The ( . . . ) indicates a short pause to "invite" the caller to barge-in:
    Computer: What needs to change? . . . The departure time . . . arrival city . . .
    Caller: (barge-in) Arrival city.
    Computer: Change anything else?
    Caller: No.
    Computer: What is the arrival city? . . . New York LaGuardia . . . Newark N.J. . . .
    Caller: Newark N.J.

In an alternative embodiment, additional information may be used to adjust the sequence in which the disambiguation options are presented. For example, each item may be flagged by the complexity of the grammar from which the item was drawn (using techniques known in the art such as counting the number of lines in the grammars or calculating the perplexities of the grammars), such that the system recognizes than an airport grammar is more complex than an airline grammar and this information may then be used to sort the items in those instances when two or more items have the same level of confidence, putting corrections for more complex grammars before those for less complex grammars.

FIG. 1 is a flow chart illustrating a method 100 of efficiently choosing multiple database entries. The method 100 may begin in step 105 where the system requests an information input from the user. For example, as set forth previously, the user may be asked in which airline the user is interested, or for any other data item for which the underlying database may be searched. The user then provides the information to the system.

In step 110, the system assigns a confidence level to the information supplied by the user. The confidence score may be determined by a speech recognition system. The confidence score indicates the likelihood that a particular word candidate or series of word candidates accurately reflects a corresponding user spoken utterance. The confidence score may be a value derived from acoustic models, lexical models, and language models. For example, the confidence score may take into account the likelihood that a particular word candidate or word candidates represent a user spoken utterance as determined using an acoustic model, in addition to, the probability that the particular word candidate may be located next to another word or group of words as determined using a language model. The system of the present invention then assigns a HIGH, MEDIUM, or LOW confidence level to the text result based upon the raw confidence score provided by the speech recognition system.

If the confidence level is LOW, then the system performs an immediate confirmation step 115, with the resulting information having a newly assigned confidence level, LOW, MEDIUM or HIGH. If the newly assigned confidence level is LOW, then another immediate confirmation step is performed. This repeats until the information received has a MEDIUM or HIGH confidence level or until the system, after a predetermined number of iterations, transfers the user to a customer service representative. If the newly assigned confidence level is MEDIUM or HIGH, then the information is sent to the batch confirmation step 130.

If the confidence level assigned in step 110 is MEDIUM or HIGH, then step 120 results in the information being placed into the data that will be confirmed in the batch confirmation step 130. Step 125 determines whether any additional information is needed from the user. If additional information is needed, then the method returns to step 105 and the method continues until the system has obtained all of the initial information. If no additional input is needed, then the batch confirmation method step 130 is performed.

Figure 2:
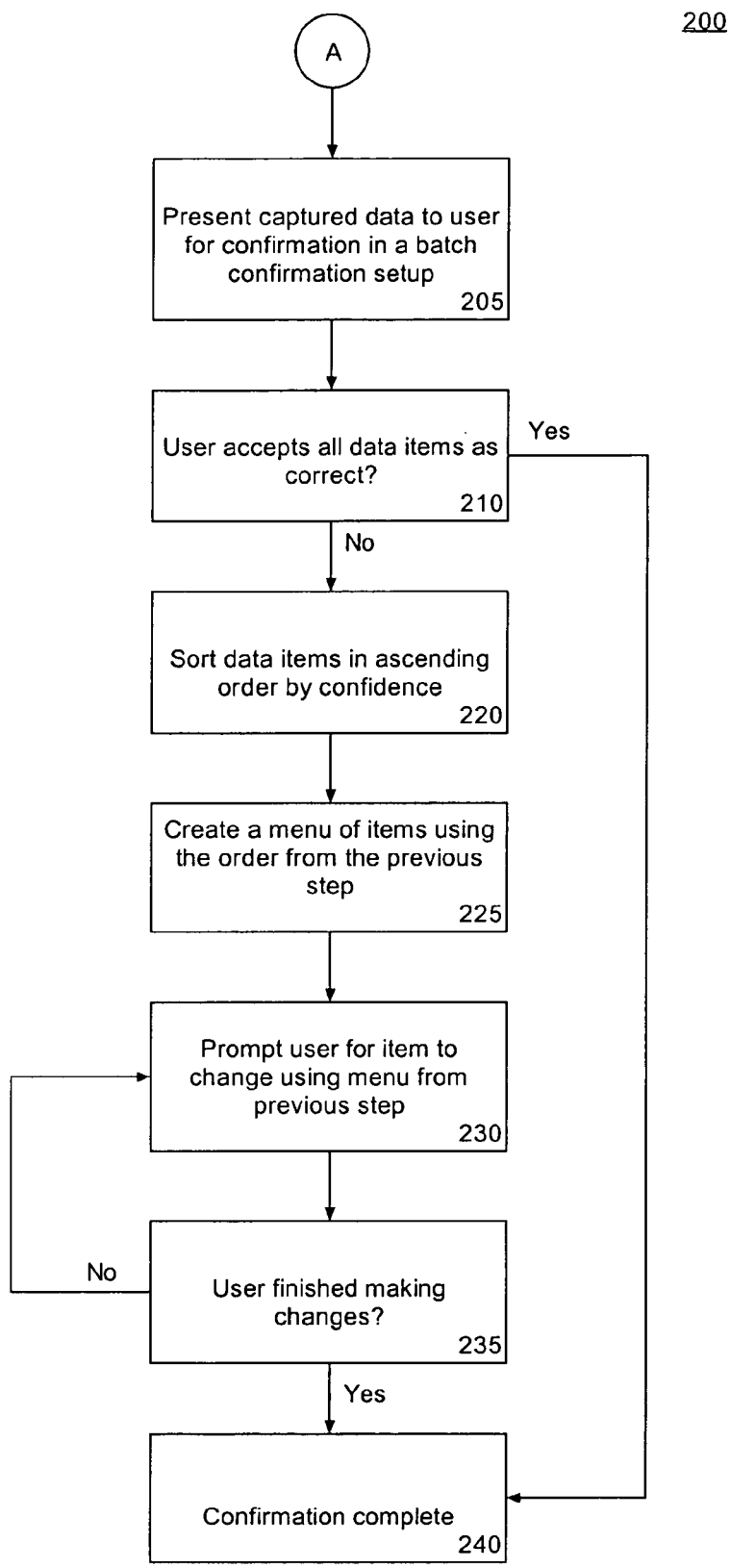
FIG. 2 is a flow chart illustrating a method of performing a batch confirmation step in accordance with the inventive arrangements disclosed herein.

FIG. 2 is a flow chart illustrating a method 200 of performing a batch confirmation. The method 200 begins in step 205 wherein the system presents captured information to the user for confirmation in the batch confirmation method 200. In step 210, the user is queried as to whether all the information is correct. If yes, then the method proceeds to step 235 and the batch confirmation is complete. If the user responds negatively, then the method proceeds to step 215. In step 215, the information is sorted in ascending order by confidence level, with all MEDIUM confidence level information items being sorted before any HIGH confidence level items are sorted. In step 220, the system creates a menu of items that may be changed using the order from step 215. In step 225, the user is prompted for an information item to be changed using the menu from step 220. The user then selects the desired option, thereby ending step 225. At this point, the user is then presented with the grammar set for the item selected. The user selects the desired option from the grammar list, thereby confirming the selected information item. Then, in step 230, the user is asked whether the user is finished making changes to the information. If yes, then the method proceeds to step 235 and the confirmation is complete. If no, then the system returns to step 225 and the list menu of items is presented until the user has finished making all the desired changes.

In another embodiment, all information inputs are assigned to the batch confirmation step 130 and no immediate confirmation steps 115 are used with information having a LOW confidence level. In this embodiment, the LOW confidence level items would be sorted prior to the MEDIUM confidence level items in step 215 and would be presented to the user before any MEDIUM confidence levels in step 225.

Once the user has finished the batch confirmation step, the system may present the information again for final verification or the system may proceed to the next step. The next step may be to process the information collected and present the results to the user, such as flight status, available flights, name, address, telephone number, etc., depending on the type of system in which the present invention is used.

Alternatively, the system may return to the initial information gathering step to determine whether the user desires any additional information, such as flight status for another flight, another address, etc. The system may also present an option for the user to exit the system.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embodied in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computer-implemented method of efficiently presenting correction options in a speech-based user interface, comprising;
   receiving at least one speech information input;
   processing the at least one speech information input and determining a confidence score for the at least one speech information input by a speech recognition device;
   assigning a HIGH, MEDIUM, or LOW confidence level to the at least one speech information input based upon the confidence score;
   if the confidence level is LOW, performing an immediate confirmation step by speech prompting the user to confirm the speech information input until the confidence level of the speech information input is HIGH;
   if the confidence level is MEDIUM or HIGH, placing the at least one speech information input in batch data; and
   performing a batch confirmation step after all speech information inputs have been received and assigned a confidence level by speech prompting the user to confirm all speech information inputs;
   wherein the batch confirmation step is performed by
      presenting to a user the batch data to be confirmed;
      prompting the user to select an information input to be changed;
      sorting items in the batch data in ascending order by the assigned confidence level if the user selects an information input to be changed;
      creating a menu of items using the order from the sorting step; and
      prompting a user to select a new information input.

2. A machine-readable storage having stored thereon, a computer program having a plurality of code sections, said code sections executable by a machine for causing the machine to perform the steps of:
   receiving at least one speech information input;
   processing the at least one speech information input and determining a confidence score for the at least one speech information input by a speech recognition device;
   assigning a HIGH, MEDIUM, or LOW confidence level to the at least one speech information input based upon the confidence score;
   if the confidence level is LOW, performing an immediate confirmation step by speech prompting the user to confirm the speech information input until the confidence level of the speech information input is HIGH;

if the confidence level is MEDIUM or HIGH, placing the at least one speech information input in batch data; and performing a batch confirmation step after all speech information inputs have been received and assigned a confidence level by speech prompting the user to confirm all speech information inputs;

wherein the batch confirmation step is performed by
presenting to a user the batch data to be confirmed;
prompting the user to select an information input to be changed;
sorting items in the batch data in ascending order by the assigned confidence level if the user selects an information input to be changed;
creating a menu of items using the order from the sorting step; and
prompting a user to select a new information input.

3. A computer-implemented system of efficiently presenting correction options in a speech-based user interface, comprising;

means for receiving at least one speech information input;

a speech recognition device for processing the at least one speech information input and determining a confidence score;

means for assigning a HIGH, MEDIUM, or LOW confidence level to the at least one speech information input based upon the confidence score;

means for performing an immediate confirmation step if the confidence level is LOW by speech prompting the user to confirm the speech information input until the confidence level of the speech information input is HIGH;

means for placing the at least one speech information input in a batch data if the confidence level is MEDIUM or HIGH; and means for performing a batch confirmation step after all speech information inputs have been received and assigned a confidence by speech prompting the user to confirm all speech information inputs;

wherein the means for performing the batch confirmation step performs the batch confirmation by
presenting to a user the batch data to be confirmed;
prompting the user to select an information input to be changed;
sorting items in the batch data in ascending order by the assigned confidence level if the user selects an information input to be changed;
creating a menu of items using the order from the sorting step; and
prompting a user to select a new information input.

* * * * *